United States Patent
Kowalczyk

(10) Patent No.: US 10,745,552 B2
(45) Date of Patent: Aug. 18, 2020

(54) ALUMINUM ORGANIC THICKENERS FOR THERMOSET RESINS

(71) Applicant: FedChem, LLC, Cleveland, OH (US)

(72) Inventor: Gregory Edward Kowalczyk, Nazareth, PA (US)

(73) Assignee: FEDCHEM, LLC, Cleveland, OH (US)

(*) Notice: Subject to any disclaimer, the term of this patent is extended or adjusted under 35 U.S.C. 154(b) by 6 days.

(21) Appl. No.: 16/021,956

(22) Filed: Jun. 28, 2018

(65) Prior Publication Data

US 2020/0002530 A1 Jan. 2, 2020

(51) Int. Cl.
| | |
|---|---|
| *C08L 67/06* | (2006.01) |
| *C08J 5/04* | (2006.01) |
| *C08J 3/20* | (2006.01) |
| *C08K 5/098* | (2006.01) |

(52) U.S. Cl.
CPC ............... *C08L 67/06* (2013.01); *C08J 3/203* (2013.01); *C08J 5/043* (2013.01); *C08K 5/098* (2013.01); *C08J 2367/06* (2013.01)

(58) Field of Classification Search
CPC ............ C08L 67/06; C08K 5/09; C08K 5/098
See application file for complete search history.

(56) References Cited

U.S. PATENT DOCUMENTS

| | | | | |
|---|---|---|---|---|
| 2,892,780 | A | * | 6/1959 | Rinse .................... C08F 283/01 508/455 |
| 3,361,845 | A | * | 1/1968 | Nanba .................. C08F 283/01 525/13 |
| 4,049,748 | A | | 9/1977 | Bailey |
| 4,264,370 | A | * | 4/1981 | Turner ................... C08K 5/057 106/264 |
| 4,265,795 | A | * | 5/1981 | Sekmakas ............ C09D 5/4411 204/500 |
| 4,265,975 | A | | 5/1981 | Pratt |
| 4,277,392 | A | | 7/1981 | Feldman et al. |
| 4,425,287 | A | | 1/1984 | Hesse et al. |
| 5,270,357 | A | | 12/1993 | Hesse et al. |
| 6,117,221 | A | * | 9/2000 | Nagashima ........ C09D 11/0235 106/236 |
| 7,829,637 | B2 | | 11/2010 | Guha et al. |
| 7,888,521 | B2 | | 2/2011 | Patton et al. |
| 7,932,345 | B2 | | 4/2011 | Jernigan et al. |
| 8,241,739 | B2 | | 8/2012 | Schonfeld et al. |
| 2006/0283094 | A1 | * | 12/2006 | Crissey .................... C09G 1/02 51/307 |
| 2013/0324653 | A1 | * | 12/2013 | Bollard .................... C08F 2/18 524/251 |

FOREIGN PATENT DOCUMENTS

| | | | |
|---|---|---|---|
| JP | 04366184 A | * | 12/1992 |
| JP | 2005120081 A | * | 5/2005 |
| RU | 2448124 C2 | | 4/2012 |
| WO | 1997041165 A1 | | 11/1997 |

OTHER PUBLICATIONS

Google translation of JP 2005-120081 (2005, 5 pages).*
Human translation of JP 04-366184 (1992, 32 pages).*
PCT Patent Office, "International Search Report and Written Opinion for PCT Patent Application No. PCT/US2018/040016", dated Feb. 21, 2019, 9 pages.
Hamid Kia, Sheet Molding Compounds Science and Technology (Hanser Publishers 1993)(pp. 69-73).
Fedchem, "Manalox 310", Retrieved At: <<http://www.fedchem.com/products/rheology-modifiers-for-inks/manalox-310/>>, Retrieved Date: Mar. 29, 2018, 4 pages.

* cited by examiner

*Primary Examiner* — Brieann R Johnston
(74) *Attorney, Agent, or Firm* — Medley, Behrens & Lewis, LLC

(57) ABSTRACT

Aluminum organic thickeners have been developed for use as thickening agents for thermoset sheet molding compounds and bulk molding compounds. The role of the thickening agent is to control the viscosity of the molding compounds throughout the production processes. The thickeners include an aluminum chelate complex, 10% to 50% by weight of a polyester or polyester acrylate carrier resin, and 10% to 50% by weight of a diluent such as a petroleum distillate. A molding compound includes an aluminum chelate complex thickening agent, a thermosetting resin, reinforcing fibers or microspheres, a crosslinking initiator, and an inhibitor. A method of making a molding compound, such as SMC or BMC with the improved thickener is also provided.

17 Claims, 2 Drawing Sheets

ALUMINUM ORGANIC THICKENERS FOR THERMOSET RESINS

BACKGROUND

One of several areas where thermoset resins are used is in molding compounds for composite systems. This includes sheet molding compounds (SMC) and bulking molding compounds (BMC). The composite systems such as fiber reinforced plastics are prepared on a compounding machine where fibers are incorporated into thickened paste. The paste typically comprises a resin, filler, initiator (for crosslinking), inhibitor, mold release agent, and thickening agent. Historically and currently, the primary thickening agents for sheet and bulk molding compounds have been magnesium oxide (MgO) and magnesium hydroxide ($Mg(OH)_2$).

A key requirement for compounding and molding thermoset resins is controlling the viscosity throughout the production processes. The role of the thickening agent is to provide the required increase in viscosity of the resin paste mixture at a controlled rate during compounding, maturation (storage), and molding. For compounding, the viscosity should not exceed certain limits or the thickened resin paste mixture will not allow fiber wet-out. During maturation, the thickened fiber reinforced resin paste mixture will continue to increase in viscosity to the target molding viscosity. One challenge in using MgO and $Mg(OH)_2$ thickeners is an upward drift in viscosity over time that will push the compound beyond the targeted molding viscosity, causing the material to be scrap. Conversely, if the compound is not thickened sufficiently the time required to reach molding viscosity could be excessive, e.g., over 72 hours, which affects production schedules detrimentally. Variations in raw materials (resins and filler) will also affect the thickening rate. Moisture is another challenging issue that affects the thickening reaction with MgO thickeners. This includes moisture in the raw materials and/or ambient moisture in the production facility.

In addition, for many polymeric articles of manufacture, performance characteristics including tensile properties are very important, these must also be balanced against processability requirements. Achieving a balance of excellent material and processing properties is a difficult endeavor and is complicated by the unpredictability of chemical interactions between various materials used in such compositions. It is particularly difficult to achieve an excellent balance of properties through compounding, maturation, and molding without adversely affecting the physical properties of the molded product.

SUMMARY

A thickening agent is needed that resolves the challenging issues mentioned above or at least addresses them and improves the problems. Specifically, it would be desirable to have a thickening agent that reaches the targeted molding viscosity in a specified time with little or no drift, that delivers the specified viscosity and is not adversely affected by moisture, is not adversely affected by variations in raw materials, and provides a controlled viscosity increase that allows the resin to wet-out fibers during the compounding step. In sum, it would be desirable to have a thickening agent that is reliable and consistent for the molding compound applications.

In an embodiment, a thickener for a molding compound includes an aluminum chelate complex, 10% to 50% by weight of a petroleum distillate, and 10% to 50% by weight of a polyester or polyester acrylate carrier resin.

In an embodiment, a molding compound comprises a thickener including an aluminum chelate complex, a thermosetting resin, reinforcing fibers or microspheres, a crosslinking initiator, and an inhibitor.

In an embodiment, a method of making a molding compound for a molded product, includes the steps of: forming a resin paste including thermosetting resin, a crosslinking initiator, and an inhibitor; thickening the resin paste by adding an effective amount of thickener to reach a viscosity that is effective to wet-out the reinforcing fibers, and is no more than 100,000 cP as determined by a Brookfield viscometer at 1 atm and 25° C. to form a thickened resin paste with reinforcing fibers, wherein the thickener includes an aluminum chelate complex; dispersing reinforcing fibers in the resin paste; compounding the thickened resin paste with reinforcing fibers; and, after compounding, producing a thickened molding compound by allowing the thickened resin paste with reinforcing fibers to further thicken to a molding viscosity of 10 to 30 million cP.

DETAILED DESCRIPTION

Figure 1:
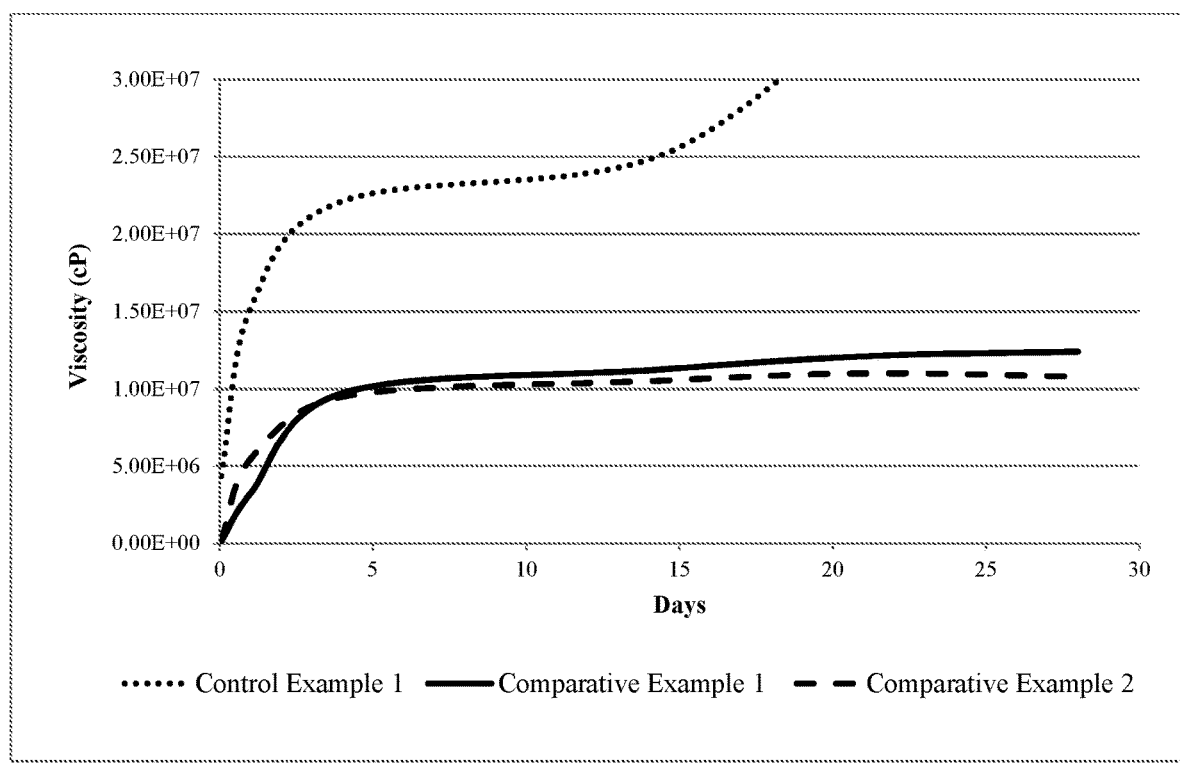
FIG. 1 is a graph of viscosity over time of control and comparative example molding compounds.

Various technologies pertaining to metal thickeners, resins and polymeric materials are described herein. In the following description, for purposes of explanation, numerous specific details are set forth in order to provide a thorough understanding of one or more aspects. It may be evident, however, that such aspect(s) may be practiced without these specific details. Except when the context clearly indicates the contrary, the term "polymer" is meant to also encompass copolymers. Unless the context clearly indicates to the contrary, the term "resin" is meant to indicate a natural or artificial oligomeric or polymeric material.

The role of the thickening agent is to control the viscosity of the formulation throughout the production processes. The thickening agent is added to the paste formulation. This begins the thickening process. The thickened paste is applied to the compounding machine where the paste is blended with the fibers. During the compounding step, the paste will increase in viscosity. The paste should remain below 100,000 centipoise (cP) for 20 to 30 minutes to insure fiber wet out. Typically, the resin paste fiber mixture will continue to increase in viscosity during the compounding step resulting in a formable solid. The formable solid is staged until the target viscosity for molding is achieved (10 to 25 million cP). Maturation to molding viscosity typically requires 48 to 72 hours. In prior methods and compounds with MgO or $Mg(OH)_2$ thickeners the viscosity would creep upward, whereas with the process and compound described herein, the viscosity plateaus. In prior methods, the material may have required cold storage to minimize viscosity creep or this creep could result in the material becoming scrap.

Disclosed herein is an aluminum-based thickener, and a resin composition including the aluminum-based thickener and other additives. A molding compound incorporating the thickener is also disclosed, as well as a method of making the thickener, the thickened resin, the sheet molded compound, and final product. The aluminum chelate is a primary component of the thickener, but the thickener also includes a carrier resin, and optionally other components.

Aluminum organic compounds including aluminum alkoxides, aluminum acylates, and aluminum chelates are used as rheology modifiers and thickeners for resins and oils. The aluminum organic compounds provide thickening by forming covalent and coordinate linkages with hydroxyl and carboxyl groups in formulations. Certain aluminum compounds can be used as thickeners in inks and coatings. Certain aluminum-based compounds have been investigated as thickening agents for polyester and vinyl ester sheet molding compound. Not all of these aluminum organic thickeners are suitable for use with thermoset sheet molding compounds.

Several conventional aluminum organic thickeners were tested and found to have too rapid of a viscosity build to be useful for this application. The viscosity of the resin paste mixture increased so quickly, greater than 100,000 cP in less than 20 minutes that it prohibits fiber wet-out during compounding. If there is insufficient fiber wet-out the sheets will delaminate which will affect strength and molding properties. A few aluminum thickeners have a moderate viscosity build, which does allow fiber wet-out. However, mechanical testing of the molded parts had lower tensile strength compared to control MgO-thickened SMC. Certain components of conventional aluminum organic thickeners that may be desirable for ink and coatings applications may be detrimental to the tensile properties of the molded parts. Accordingly, as disclosed herein, a new and surprisingly effective aluminum chelate thickener was developed to have comparable tensile properties to that of standard MgO thickeners, while achieving processability benefits needed for compounding, and providing a stable target molding viscosity.

As disclosed herein, aluminum chelates were developed for use as thickening agents, particularly in polyester and vinyl ester molding compound applications. In an embodiment, the aluminum chelates have controlled thickening rates which allow fiber wet-out during compounding. In an embodiment, the thickened compositions reach targeted molding viscosity within 72 hours, such as 24 to 56, or 32 to 48 hours, and provide a stable viscosity without drift until the compound is ready to be molded. This plateau viscosity has been demonstrated to remain stable for weeks or longer. In an embodiment, the viscosity of the thickened molding compound does not drift more than 5% over 24 hours, when tested beginning at 48 hours after addition of the thickener, the viscosity being determined by a Brookfield viscometer at 25° C. and 1 Atm. This is a significant improvement over standard metal oxide thickeners, which continuously drift upwards in viscosity. In an embodiment, the aluminum chelate thickeners are also less sensitive to moisture, both ambient and introduced through the formulation, than the standard metal oxide thickeners. In an embodiment, the aluminum thickeners have good flow properties for molding. Mechanical testing (e.g., tensile modulus) of molded products prepared with the aluminum chelate thickened molding compounds disclosed herein are comparable or better than the products prepared with the metal oxides.

In an embodiment, the aluminum chelates evaluated thickeners for thermoset molding compounds are liquid at 25° C. and 1 atm. This improves processability and allows them to be readily metered into the resin paste mixture. For example, the aluminum chelate may have a dynamic viscosity of 20,000 cP or lower, such as 16,000 to 500 cP, or 10,000 to 1000 cP, at 25° C. and 1 atm.

In an embodiment, the simple aluminum chelate is synthesized by the following reaction. Aluminum isopropoxide (I) (CAS 555-31-7) is reacted with ethyl acetoacetate to form the simple aluminum chelate, aluminum di(isopropoxide)acetoacetic ester chelate (II) (CAS 14782-75-3). Aluminum chelates including aluminum di(isopropoxide)acetoacetic ester chelate are known as rheology modifiers or thickeners for resins and oils, such as for varnishes, inks, and coatings. See Reaction Scheme 1.

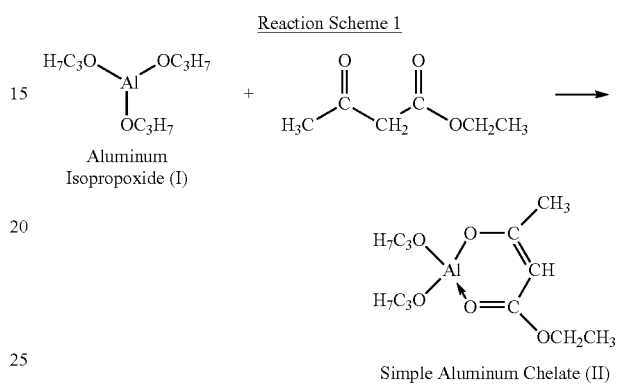

Of note with aluminum di(isopropoxide)acetoacetic ester chelate are the two isopropoxide groups. Reaction of the simple aluminum chelate with functional groups of resins and oils lead to the evolution of isopropyl alcohol. For many applications the evolution of flammable solvents is undesirable. Further reaction of the simple aluminum chelate with higher boiling alcohols or diols will replace the isopropoxide groups and generate the complex aluminum chelate. Reaction scheme 2 shows the synthesis of a complex aluminum chelate (III) starting with the simple aluminum chelate (II) reacted with a diol.

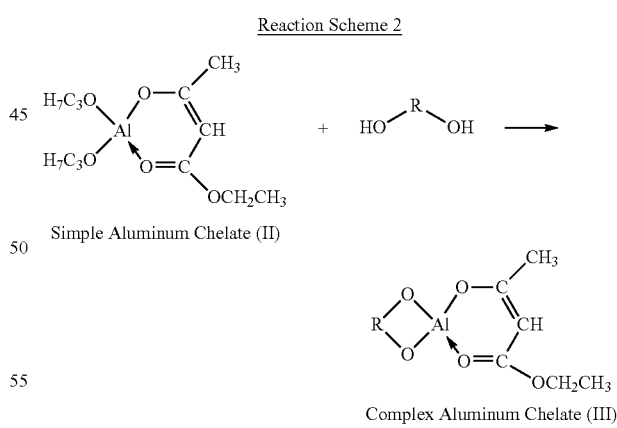

Of the aluminum compounds that were evaluated as thickening agents for SMC applications, several were of the complex chelate format (III). These aluminum chelates were prepared according to Reaction scheme 2 with the simple aluminum chelate (II) and a diol. The diol is characterized by R being selected from a $C_2$ to $C_{20}$ hydrocarbon groups, or by R being selected from $C_3$ to $C_8$ hydrocarbon groups. Diols may be selected from the group, but are not limited to: 1,2-ethanediol, 1,2-propanediol, 1,3-propanediol, 1,3-butanediol, 1,4-butanediol, 1,5-propanediol, 2,2-di-methyl-1,3-propanediol, or 2-methyl-2,4-pentanediol.

Complex aluminum chelates prepared via Reaction scheme 2 or an analog thereof (with different R groups) are characterized by structure III.

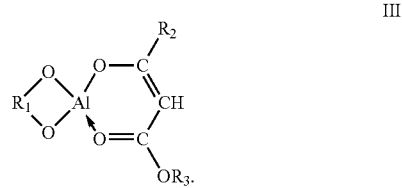

III wherein $R_1$ in structure III is independently selected from a $C_2$ to $C_{20}$ hydrocarbon group, such as, for example, a $C_3$ to $C_8$ hydrocarbon group, and $R_2$ and $R_3$ are independently selected from a $C_1$ to $C_{20}$ hydrocarbon group, such as, for example, a $C_2$ to $C_8$ hydrocarbon group.

In an embodiment, the novel aluminum thickening agent includes a complex aluminum chelate, as shown in structure III. The novel aluminum thickening agent is prepared from the simple aluminum chelate (II) and a representative diol. The novel complex aluminum chelate includes an unreactive carrier resin. Additional additives present may include petroleum distillate and/or a polar solvent which aid in the processing the complex aluminum chelate. The aluminum thickener is essentially free of water. The aluminum thickener should be soluble in hydrocarbons and oils. The thickener composition including the complex aluminum chelate and carrier resin is highly stable, e.g., for at least 3 months, or at least a year at standard temperature and pressure.

The concentration of the complex aluminum chelate in the thickener is 30% to 70% active, such as 40% to 60%, or 45% to 55%. This results in an aluminum concentration of approximately 3% to 7% or 4% to 6%. The thickener may have an aluminum content of 4% to 10% or 1% to 15% by weight. The carrier resin may comprise 10% to 50% by weight of the thickener, such as 15% to 40%, or 20% to 30%. Petroleum distillates may comprise 10% to 50% by weight of the thickener, such as 15% to 40%, or 20% to 30%. Other additives, such as a polar solvent, when present, may comprise 0.1% to 30% by weight of the total thickener composition, such as 2.5% to 25%, or 10% to 20%.

In an embodiment, the described aluminum chelates completely replace the traditional metal oxide thickening systems used in molding compounds. In an embodiment, the aluminum chelates can be used in a mixture with metal oxide thickening systems, in a weight ratio of, for example, 50% to 95% Al-chelate:50% to 5% metal oxide, such as, for example, 55% to 90%:45% to 10%, or 70% to 85%:30% to 15%. In an embodiment, the thickener is essentially free of metal oxide with the exception of residual aluminum hydroxide, which can form from moisture in the environment.

Many factors can affect the choice of a carrier resin. Two such factors are compatibility with and stability of the complex aluminum chelate component of the thickener. In addition, the carrier resin should be unreactive to the complex aluminum chelate during preparation and storage. The carrier resin should be compatible with the complex aluminum chelate as well as petroleum distillate and/or polar solvent additives. Incompatibility of the carrier resin may be indicated by phase separation, sedimentation, or crystallization. Stability of the carrier resin also relates to the reactivity towards the aluminum component of the thickener. The aluminum organic thickener comprised of the complex aluminum chelate, carrier resin, and/or petroleum distillate and/or polar solvent should remain stable based on an expected shelf life of 12-24 months. Instability of the thickener may be indicated by viscosity increase, phase separation, sedimentation, or crystallization. If the carrier resin reacts with the aluminum component at ambient conditions there could viscosity increase or premature thickening.

The thickener comprised of the complex aluminum chelate, carrier resin, and optional petroleum distillate or polar solvent should be compatible with the components of the resin paste for SMC and BMC applications. Specifically, it is anticipated the carrier will contribute to physical properties of the molded parts.

In an embodiment, the carrier resin is an unsaturated polyester resin designated as a grinding vehicle. The polyester resin may be a monomer-free low color grinding vehicle with a viscosity less than 3000 cP, e.g., 1000 to 2900 cP, or 1200 to 2500 cP. A primary application of grinding vehicles is the preparation of pigment dispersions. The polyester resin used in the examples has an acid value less than 15, specifically less than 12. In an embodiment, the polyester resin can have an acid value of 8 to 14, or 10 to 12.

In another embodiment, the carrier resin is a polyester acrylate designated as a grinding vehicle. The polyester acrylate grinding vehicle can be a low-viscosity mixture of polyester acrylate, acrylated polyester oligomer, acrylate monomer, and acrylic oligomer. The polyester acrylate resin may have a viscosity less than 1000 cP, such as 500 to 950 cP, or 600 to 850 cP. The polyester acrylate may have a Tg above 25° C., such as 26° C. to 100° C., 30° C. to 50° C., or 35 to 40° C.

The polyester or polyester acrylate carrier resin should be compatible and stable when formulated as a component of the thickener in a concentration range of 10% to 50% by weight of the thickener, such as 15% to 40%, or 20% to 30%. The carrier resin is anticipated to have good compatibility with thermoset resins used in SMC and BMC applications.

In an embodiment, a petroleum distillate oil is included in the aluminum-based thickener as a co-solvent. The petroleum distillate may be classified as a white mineral oil, commonly referred to as ink oil. Ink oil, as the name suggests, is commonly used in lithographic inks. Ink oil is composed principally of normal paraffin and naphthenic fractions of a petroleum distillate. For complex aluminum chelates used in certain conventional applications (i.e., not SMC or BMC), the ink oil is typically present at 40-60% of the thickener composition to promote stability. For solvent-based ink and coating applications, the presence of the ink oil in the complex aluminum chelate is not detrimental to the final properties. In an embodiment for molding compounds, a smaller percentage of ink oil, e.g., 15-30%, such as 18-28%, or 20-25% (by weight) can be used to process the complex aluminum chelate for the aluminum organic thickener in molding compounds. It is believed the excess ink oil (approximately 50%) has a negative impact on the tensile properties of the molded parts. With the ink oil at a smaller percentage (approximately 25%) and in combination with the carrier resin, the novel aluminum organic thickeners had tensile properties of the molded parts comparable and/or better than the MgO control (as shown in the Examples below).

In an embodiment, the ink oil, white mineral oil, is classified as a high boiling solvent. The initial boiling point of the oil can be 235° C. or greater, such as 240 to 282° C., or 250 to 278° C. The initial boiling point and boiling range is determined by ASTM D86. The ink oil, white mineral oil, may have very low aromatic content with a specification of 1.0% (wt %) maximum, such as 0.0001 to 0.9%, or 0.01 to 0.5%, as determined by ASTM D5186.

In an embodiment, a polar solvent may be present. This may be introduced as a byproduct of Reaction scheme II. In an embodiment, the solvent is an alcohol, such as a straight or branched $C_1$-$C_{10}$, $C_2$-$C_6$, or $C_3$-$C_5$ alcohol, such as methanol, ethanol, or isopropanol. The solvent may be partially or completely removed from the thickener during processing. By not completely distilling off free isopropyl alcohol, the polar solvent serves as a processing aid and co-solvent for an embodiment of the aluminum organic thickener.

The thickeners disclosed herein can, for example, be used with sheet molding compound (SMC) or bulk molding compound (BMC) materials. Reference can be to Hamid Kia, "SMC Sheet Molding Compounds, Science and Technology," 1996, incorporated herein by reference for information on SMC. BMC is a similar material used primarily for injection molding or compression molding. In addition to the thickener discussed above, a molding compound may include a thermosetting resin, reinforcing fibers, mold release agent, initiator (curing agent), inhibitor, and optionally stabilizer, filler, and other additives including colorants such as pigments or color concentrates.

The resin paste mixture is understood to be the mixture of the thermosetting resin with all further components of the formulation with the exception of the thickening agent and fibers. The viscosity of the resin paste mixture prior to the addition of the thickener is 10,000 to 30,000 cP, such as 12,000 to 28,000, or 15,000 to 25,000 cP as determined by a Brookfield viscometer at 25° C. and 1 Atm. The Brookfield LV viscometer is used herein for measuring a viscosity up to 500,000 cP; however a viscosity greater than 500,000 cP is measured with a Brookfield viscometer HB with T-bar spindels. After the addition of the thickener to the resin paste mixture, the viscosity should remain less than 100,000 cP for 20 to 30 minutes to facilitate compounding.

The polymeric thermosetting resin for the molding compound (into which the thickener is blended) is a polymer with ester-group-containing monomers, such as ester and vinyl-ester homopolymers or copolymers. For the aluminum organic thickeners to react and thicken the polymeric resin the polymer should have hydroxyl and carboxyl functional groups found in the resin types mentioned. In an embodiment, thermoset polyester or poly(vinyl ester), polyester vinyl ester blends, and polyester vinyl ester hybrids are utilized in the molding compound.

Combinations of diols and unsaturated dicarboxylic acids or the corresponding anhydrides can be used to form unsaturated polyesters. For example, monomeric acids or anhydrides can be selected from are phthalic acid (or phthalic anhydride), isophthalic acid, terephthalic acid, and maleic acid (or maleic anhydride). Diol monomers can be selected from the group consisting of: 1,2-ethanediol (ethylene glycol), 1,2-propanediol (1,2-propylene glycol), 1,3-propanediol (1,3-propylene glycol), 1,3-butanediol, 1,4-butanediol, or 2,2-di-methyl-1,3-propanediol (neopentyl glycol). In an embodiment, isophthalic acid and neopentyl glycol monomers can be used to form the polyesters. Such polyesters may have enhanced chemical and weathering resistance. Vinyl esters may be selected from novolac and/or bisphenol A type vinyl esters, which can be used for SMC or BMC.

Unsaturated polyester or vinyl ester resins are typically dissolved in a monomer possessing a crosslinking functionality. The crosslinking monomer, may include, e.g., a vinyl group, such as styrene. The crosslinking monomer participates in the crosslinking reaction of the unsaturated polyester or vinyl ester started by an initiator (radical polymerization).

In an embodiment, additional polymers may be present in the molding compound. These additional polymers can include, for example, polypropylene, polypropylene copolymer, polyethylene, polyethylene copolymer, polyamide, polyester, ABS, styrene terpolymer, and polyurethane.

In an embodiment, the number average molecular weight (Mn) of the polymeric resin is, for example, 500 to 80,000 g/mol, such as, 1,000-35,000 g/mol, or 1,500 to 5,000 g/mole. Prior to curing, the viscosity of the polymeric resin may, for example, be 0.1 to 10 Pa*s, such as 0.5 to 7 Pa*s, or 1 to 5 Pa*s.

In an embodiment, the molding compound includes a low-profile additive. The low-profile additive is added to modify shrinkage or compensate for shrinkage of the resin after curing. The low-profile additive may be, for example, a thermoplastic polymer, including polystyrene, poly(vinyl acetate), and poly(methyl-methacrylate). The low-profile additive is typically a solution of the polymer in styrene. Alternately, the low-profile additive may be a thermoset polymer such as polyester or vinyl ester, and may be stabilized in a solution in styrene. The content of low-profile additive, may be, for example, 10 to 50% by weight in styrene, such as 20 to 45, or 25 to 40% in styrene.

The molding compound also may contain an elastomer, which may function as a low profile or shrink control additive. This may be, for example, ethylene alpha-olefin copolymers where the alpha-olefin portion can contain 3-20 carbon atoms, such as 4 to 8 carbon atoms. Examples of such materials include but are not limited to ethylene octene copolymer, ethylene butene copolymer, ethylene hexene copolymer, ethylene heptene copolymer. These types of alpha olefins represent the following PE families: LDPE, VLDPE, ULDPE. Additional elastomers include, but are not limited to, ethylene propylene copolymer, ethylene propylene diene terpolymer, ethylene alpha-olefin diene terpolymer, styrenic block copolymer including styrene-butadiene-styrene and styrene-ethylene-propylene-styrene. The very low density polyethylene rubber may have a density of 0.75 to 0.95 g/cm$^3$, such as about 0.88 g/cm$^3$. The elastomer component when present may make up 50% or less of the molding compound, such as 5 to 40%, 10 to 35%, or 6 to 10%.

In an embodiment, filler is incorporated in the molding compound. Calcium carbonate may be used, in particular, for SMC applications. Other fillers may include talc, silica, clay, carbonates, glass spheres, flax, sawdust, straw, wool, or a combination of fillers. Fillers may be present in the molding compound in an amount of 0.1 to 75% by weight, such as 20 to 70%, or 50 to 65% of the molding compound.

Internal mold release agents may be used to aid in removal of the part formed by the molding compound from the mold. In an embodiment, the mold release agent is selected from the group consisting of: metal stearates, such as zinc stearate or calcium stearate or mold release agents based on surface active substances. The mold release agent may be present in an amount of 0.1 to 5% by weight of the molding compound, such as 0.5 to 3%, or 1 to 2%.

An initiator, also referred to as a hardener or accelerator, such as a free radical initiator is added to the molding compound to initiate the crosslinking (curing) reaction, thereby forming a three-dimensional polymer matrix network of the thermosetting polymer. The initiator may be, for example, a peroxide-based initiator, such as, for example, benzoyl peroxide, t-butyl peroxybenzoate, or methyl ethyl ketone peroxide. The initiator may be present in the molding compound in an amount of 0.1 to 5% by weight, 0.5 to 3%, or 1 to 2%.

In an embodiment, an inhibitor is included in the molding compound. The inhibitor may be selected, for example, from p-benzoquinone, naphthoquinone, p-toluquinone, 2,5-diphenyl-p-benzoquinone, 2,5-di-acetoxy-p-benzoquinone, hydroquinone, p-t-butylcatechol, 2,5-di-t-butylhydroquinone, di-t-butyl-p-cresol, hydroquinone monomethyl ether, or combinations thereof. The content of inhibitor, may be, for example, 0.01 to 2% by weight of the total molding compound, such as 0.1 to 1%, or 0.15 to 0.75%.

In an embodiment, additional additives of a molding compound may include colorants either as pigments (carbon black, titanium dioxide), pigment dispersions (in polyester grinding vehicles), polymeric color concentrates (dispersed in polyester grinding vehicles), or other pigmented or dyed components. Additional additives may include flame retardants such as aluminum hydroxide. Other additives may include antioxidants such as butylated hydroxytoluene (BHT). The concentration of the additional additives will vary according to the effective dosage for the additive in question; however, for example, each these may be present in an amount of 0.001 to 10%, 0.01% to 5%, or 0.1% to 2%.

The thickener for the molding compound is as described above. Thickeners are added to thermoset molding compound to provide the controlled increase in viscosity during compounding, maturation (storage), and molding. In an embodiment, the aluminum organic thickeners may be present at levels of 0.5 to 6% by weight of the resin paste formulation, such as, for example, 0.8 to 3% or 1 to 2%.

In an embodiment, reinforcing fibers are included in the molding compound. These reinforcing fibers may include glass fibers (rovings), carbon fiber, aramid fiber, basalt fiber (geotextile fiber) or natural fibers like hemp, flax, jute, fleece, woven fabrics, or a combination of two or more of the above reinforcing fibers. The linear density (tex) of rovings for SMC may be, for example, 2000 tex to 5000 tex, such as 2400 to 4800 tex, or 3000 to 4200 tex, as determined by ISO 1889. Single filaments are formed into bundles through the use of a sizing that is applied onto the filaments. The sizing may be a mixture of an antistatic agent, a film former, a lubricant, and a coupling agent. This improves interaction between the glass fiber surface and the unsaturated polyester or vinyl ester resin. The reinforcing fiber may be present in an amount of 15 to 45%, such as 20 to 40%, or 25 to 35%.

The final molded product is a cross-linked thermoset polymeric material, molded to a desired shape. The molded product can be, for example, automotive parts, appliance housings, and electrical housings. It may be formulated to have high heat resistance, fire-resistance, and electrical insulation properties, as well as being durable to weathering and have excellent tensile modulus properties.

In an embodiment, the molded product has comparable or improved e.g. improved by 0.1% to 10%, or 3 to 5% in one, any combination of, or all of tensile strength, tensile modulus, flexural strength, or flexural modulus over compounds that use a traditional metal oxide thickener, as determined by ISO 527 and ISO 14125. This is a synergistic and surprising benefit along with the improved processability of the compound having little or no drift in viscosity.

A summary of the process of making the molding compound and final product is provided below, then further details of the steps are provided. The thermosetting resin paste mixture is prepared. A thickener is added to the resin paste mixture starting the thickening mechanism. In an embodiment, thickened resin paste mixture is deposited onto a carrier film and the fiber is cut onto the deposited paste. A top layer of the thickened resin paste mixture is deposited onto the fibers and a sandwich structure is formed: carrier film-resin paste-fibers-resin paste-carrier film. During the compounding step the fibers disperse through and are covered by the paste ("wetting-out" the fibers). The sandwiched product is taken off the compounding machine and stored for maturation to the targeted molding viscosity. It can then be cut into charges and molded through a die into a molded shape.

The thickener is a central component to the molding compound and process, as controlling the viscosity throughout the production is important. In an embodiment, during compounding of the molding compound, the thickening agent is used to thicken the paste to 50,000 to 80,000 centipoise (cP), such as 60,000 to 78,000, or 65,000 to 75,000 cP. The range should be thick enough to wet-out the fibers during compounding. For compounding, the viscosity should remain less than 100,000 cP for 20 to 30 minutes, such as 40,000 to 80,000, or 45,000 to 70,000 cP. Once compounding is complete, the viscosity will continue to rise during storage (maturation) until the targeted molding viscosity is achieved. In an embodiment, the target molding viscosity of the molding compound is 10 to 30 million cP, such as 12 to 23 million cP, or 15 to 20 million cP. The process and thickener disclosed herein prevent the compound's viscosity from creeping above these levels. In particular, if the viscosity becomes greater than 30 million cP, the compound will not flow to fill the mold.

For metal oxide thickened compound, the target viscosity is generally reached in 48 hours. However, in such compounds there is upward drift in viscosity over time that cause the compound to drift beyond the targeted molding viscosity and the material is thereby rendered unusable. Conversely, the time required to reach molding viscosity could be greater than 72 hours, which affects production schedules. Variations with raw materials (resins and filler) will affect the thickening rate. Moisture is a key issue that affects the thickening reaction with MgO thickeners. This includes moisture in the raw materials and/or ambient moisture in the production facility. By using the thickeners disclosed herein, once the targeted viscosity is achieved, the compound viscosity is stable (with minimal to no drift). Furthermore, it delivers the specified viscosity and is not adversely affected by moisture. It also, provides a thickening agent with a controlled viscosity increase that allows the resin to wet-out fibers during the compounding step and is reliable and predictable for the intended applications.

In an exemplary method of making the thickener, an aluminum alkoxide, such as aluminum isopropoxide, is reacted with is an alkyl acetoacetate, such as ethyl acetoaceatate to form the simple aluminum chelate, aluminum di(isopropoxide)acetoacetic ester chelate. Further reaction of the simple aluminum chelate with higher boiling alcohols or preferably diols will replace the isopropoxide groups and generate the complex aluminum chelate. The diol is typically characterized by R selected from a $C_2$ to $C_{20}$ hydrocarbon groups, or preferably by R selected from $C_3$ to $C_8$ hydrocarbon groups. In an embodiment a petroleum distillate, high boiling oil, is added as a processing aid to remove the isopropyl alcohol through distillation prior to blending with the carrier resin. In another embodiment, the complex aluminum chelate is partially distilled and blended with a carrier resin.

In an exemplary method of making a molding compound, a resin paste is first formed. The thermosetting resin, low profile additive, fillers, initiator (curing agent), inhibitor (stabilizing agent), mold release agent, and further optional ingredients (including colorants, flame retardants, and antioxidants) are mixed in a non-continuous process in a mixer to form the resin paste. The thickener and reinforcing fiber are not yet included. The viscosity of the resin paste mixture is on the order 10,000-30,000 cP as determined with a Brookfield viscometer at 25° C. and 1 Atm. With the addition of the thickener there is an increase in viscosity of the resin paste mixture. The viscosity of the resin paste mixture should remain below 100,000 cP for a minimum 20 to 30 minutes to allow fiber wet out during compounding. The viscosity will continue to increase during storage (maturation) until the targeted molding viscosity is achieved.

For SMC applications, the thickened resin paste mixture is applied to a carrier film to which chopped glass rovings are added, sandwiched between a top layer of the thickened resin paste mixture. With the viscosity below 100,000 cP for 20 to 30 minutes, the fibers are incorporated into the resin paste mixture through kneading and compression action during compounding. The viscosity continues to increase as the formable sheet of approximately 10 to 15 mm is taken off the compounding machine. Typically the thickened molding compound material is taken off in in a rolled form and stored (maturation) until the molding viscosity is achieved. e.g., 10 to 30 million cP.

There is a targeted viscosity range for SMC, such as 10 to 30 million cP, such as 12 to 23 million cP, or 15 to 20 million cP, as determined with a Brookfield HB viscometer at 25° C. and 1 Atm. In an embodiment, the viscosity of SMC prepared with the aluminum organic thickeners plateaus within the targeted viscosity range. Once the molding viscosity is achieved, there is little or no drift (e.g., no more than 5%, 2%, or 1% in viscosity change).

In preparation of molding, the SMC is unrolled and then the sheets are cut into a desired form, and the carrier film can be removed without resin sticking to the film. The tack free sheets can be placed into the mold either individually or stacked several high depending on complexity and requirements of the mold. The sheet is then put into the mold and the mold is closed.

During molding, initially due to the influence of elevated temperature and pressure, the SMC will lower in viscosity to flow to fill the cavity of the mold. As the molding stage progresses, the elevated temperature and pressure will facilitate the curing mechanism of the thermoset material leading to cured molded part. The molding temperature may be for example, 135° to 155° C. and the molding pressure may be 30 bar to 100 bar. The molding time may be 30 seconds to 10 minutes, such as, for example, 1 minute to 3 minutes, or 2 minutes to 6 minutes. The mold may be steel and may be chrome-plated to facilitate demolding and to increase the surface quality of the molded parts.

Further details of the compounding and molding process are disclosed in Hamid G. Kia, "Sheet Moulding Compounds—Science and Technology", Hanser Publishers, Munich, 1993 or Arno Gardziella, "Duroplastische Harze, Formmassen and Werkstoffe", Expert Verlag, Renningen, 2000, each of which are incorporated herein by reference.

EXAMPLES

Example 1

An intermediate form of the complex aluminum chelate was obtained by reacting the simple aluminum chelate (Reaction 1) followed by further synthesis with a representative diol (Reaction 2) to form the complex aluminum chelate (III). The intermediate complex aluminum chelate (III) was prepared with 1.0:1.0 molar ratio of simple aluminum chelate to representative diol. The intermediate complex was a stable golden solution in isopropyl alcohol with an aluminum concentration of 7.0 to 7.4% and was approximately 68 to 72% active in the byproduct isopropyl alcohol from Reaction 2. The complex aluminum chelate intermediate is indefinitely stable. The intermediate material was processed and modified as discussed below to yield the experimental aluminum organic thickeners.

Example 2

In Example 2, an aluminum organic thickener was synthesized. Starting with Example 1 having an aluminum concentration of 7.4%, the following steps were taken to synthesize the thickener. (Target aluminum content for the thickener was 5.1 to 5.2% (49 to 50% active).

1095.8 g of Example 1 was added (7.4% Al) to a 3-neck reaction flask with mechanical stirrer and distillation column.

The flask was heated to about 88° C. and held for several minutes until the target distillate of 30 g was reached.

The flask was cooled to about 75° C. 524.1 g of unsaturated polyester resin, monomer free grinding vehicle with an acid value <15, was added and mixed for 30 minutes.

The resulting product was cooled to room temperature and packaged.

This resulted in a thickener with the following approximate contents, 50% Example 1+33% unsaturated polyester resin+17% free isopropanol. The novel aluminum organic thickener is a golden liquid with a viscosity less than 5000 cP determined with a Brookfield LV viscometer at 25° C. and 1 Atm with an aluminum content of 5.1%.

Example 3

In Example 3, another aluminum organic thickener was synthesized. Starting with Example 1, at 7.4% aluminum content, the following steps were taken to synthesize the thickener. (Like Example 2, the target aluminum content for the thickener was 5.1 to 5.2% (49 to 50% active).

977.2 g of Example 1 was added (7.4% Al) to the 3-neck reaction flask with mechanical stirrer and distillation column.

355 g of high boiling ink oil, white mineral oil with a boiling range of 252 to 278° C., was added to the flask.

The flask was heated to 125° C. and held for 30 minutes (isopropyl alcohol from Example 1 was distilled off).

The flask was held at 125° C. under full vacuum for 60 minutes to complete the distillation.

The vacuum was broken and the flask cooled to ≤80° C.

355 g of unsaturated polyester resin, monomer-free grinding vehicle with an acid value <15, was added and mixed for 30 minutes.

The resulting mixture was cooled to room temperature and packaged.

The resulting aluminum organic thickener, had the following approximate contents, 50% Example 1 (complex aluminum chelate III), +25% unsaturated polyester resin+ 25% high boiling ink oil. The novel aluminum organic thickener is a golden liquid with a viscosity less than 10,000 cP determined with a Brookfield LV viscometer at 25° C. and 1 Atm with an aluminum content of 5.1%.

Example 4

In Example 4, another aluminum chelate thickener was synthesized. Starting with Example 1, at 7.4% aluminum content, the following steps were taken to synthesize the thickener. (Like Example 2 and 3, the target aluminum content for the thickener was 5.1 to 5.2% (49 to 50% active).)

315.1 g of Example 1 was added (7.4% Al) to a 3-neck reaction flask with mechanical stirrer and distillation column.

110 g of high boiling ink oil, white mineral oil with a boiling range of 252-278° C., was added to the flask.

The flask was heated to 125° C. and held for 30 minutes (isopropyl alcohol from Example 1 was distilled off).

The flask was held at 125° C. under full vacuum for 60 minutes to complete the distillation.

The vacuum was broken and the flask cooled to ≤80° C.

110 g of polyester acrylate resin, low viscosity grinding vehicle with a Tg=37° C. was added and mixed for 30 minutes.

The resulting mixture was cooled to room temperature and packaged.

The resulting aluminum organic thickener had the following approximate contents, 50% Example 1 (complex aluminum chelate III), +25% unsaturated polyester acrylate resin+25% high boiling ink oil. The novel aluminum organic thickener was an amber liquid with a viscosity less than 4000 cP at 25° C. and 5.1% aluminum content.

For the aluminum organic thickeners described in Examples 2, 3, and 4; the active thickening agent is a complex aluminum chelate (III). For Example 2, the byproduct alcohol was partially stripped prior to adding the unsaturated polyester resin. The alcohol could not be completely removed from the intermediate without going to higher temperatures and/or vacuum stripping. The polyester resin may start to cure at processing temperatures above 100° C. and the complex aluminum chelate requires a co-solvent to remain in solution.

For Examples 3 and 4, the high boiling ink oil was added to the intermediate complex chelate, which allowed the higher temperature vacuum stripping to remove the byproduct isopropyl alcohol. The high boiling ink oil functions as the co-solvent for the complex aluminum chelate to remain in solution. By vacuum stripping the Examples 3 and 4, the resulting products have flash points greater than 61° C. as determined by ASTM D93. Generally, it is highly desirable for transportation, storage, and production to have high flash points, such as greater than 61° C., for example, 65° C. to 175° C., or 70° C. to 125° C., for many applications.

Comparative Examples 1 and 2 and Control Example 1

In developing the aluminum organic thickeners for thermoset resins, numerous viscosity studies were conducted with an SMC resin test paste. The test paste was comparable to a standard SMC resin paste and contained thermoset polyester resin, low profile additive (shrink control), filler (calcium carbonate), initiator (curing agent), inhibitor (stabilizing agent), and mold release agent (zinc stearate). The viscosity studies monitored the viscosity build and stability of the thickening agent in a test resin paste mixture.

In a series of evaluations, an MgO thickener (Control Example 1) was compared with complex aluminum chelate thickeners (Comparative Examples 1 and 2). For this series the target viscosity was 10 to 15 million cP with the thickener addition levels at 0.8% MgO, 1.2% for Comparative Example 1, and 1.0% for Comparative Example 2. The Comparative Example 1 and 2 thickeners were 50% active in the high boiling ink oil and are differentiated based on the complexing diol.

The thickeners were added to the test paste with a high-speed mixer and the viscosity was recorded with a Brookfield HB high viscosity viscometer equipped with T-bar spindles. The results of this evaluation are shown in FIG. 1. Commercial complex aluminum chelate thickeners (Comparative Examples 1 and 2) reached the targeted viscosity in 72-96 hours and remained stable for four weeks with minimal drift and remained in the target molding viscosity range of 10 to 15 million cP. The commercial complex aluminum chelate thickeners of Comparative Examples 1 and 2 had no carrier resin. The MgO control reached the target viscosity in 24 hours, but the viscosity continued to drift upward and surpassed the upper region for molding of 25 million cP at two weeks. As previously stated, the complex aluminum chelates of Comparative Examples 1 and 2 were shown to be effective and stable thickeners for the viscosity studies. However, during machine trials comparing the MgO control with the commercial complex aluminum chelates, physical testing, tensile and flexural properties, of the molded parts did not match the physical properties of the MgO control.

Examples 5 and 6

Additional viscosity studies were completed with commercial complex aluminum chelate (Comparative Example 1) and the experimental aluminum organic thickeners (Examples 2-4) in the SMC test paste as described above (i.e. containing thermoset polyester resin, low profile additive (shrink control), filler (calcium carbonate), initiator (curing agent), inhibitor (stabilizing agent), and mold release agent (zinc stearate)). This demonstrated the modification of the complex aluminum chelate thickeners as described in Examples 2 through 4 produced effective and stable thickeners for SMC and BMC applications. Experimental thickeners of Examples 3 and 4 were added to the SMC test paste described above and these experimental paste compositions correspond to Examples 5 and 6.

Figure 2:
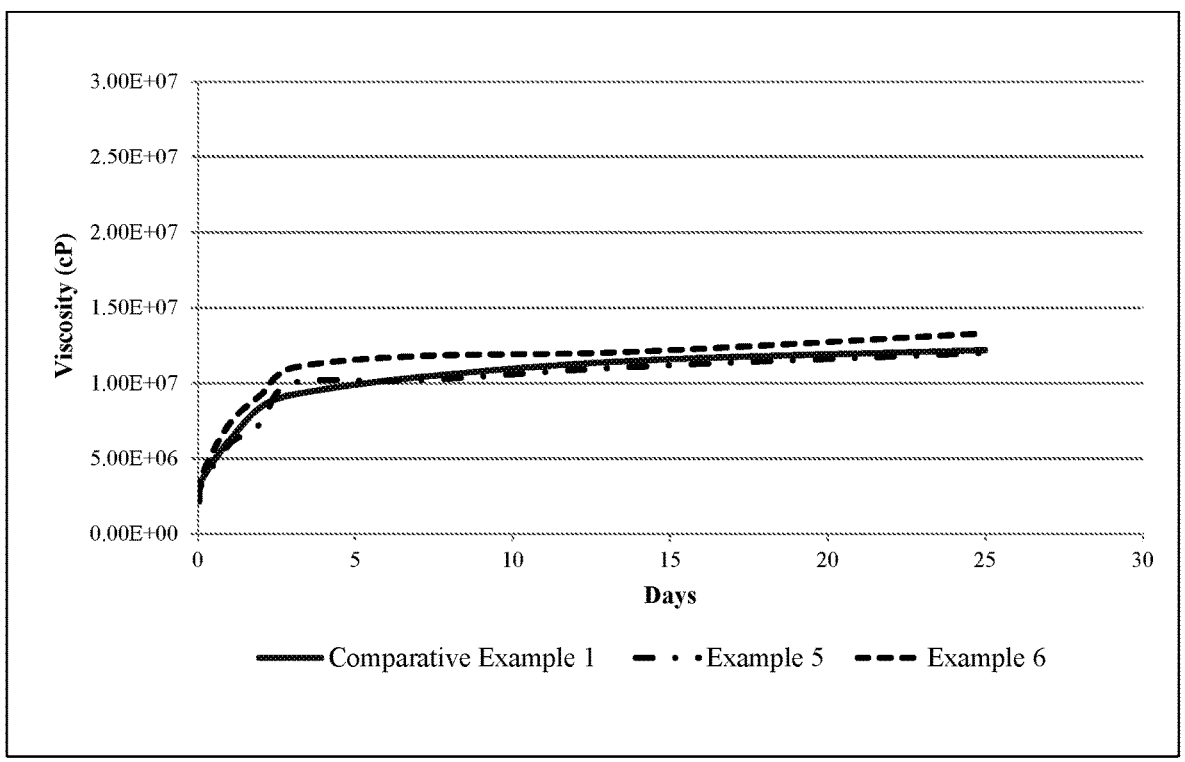
FIG. 2 is a graph of viscosity over time of example and comparative example molding compounds.

FIG. 2 shows the results of a viscosity study with the SMC test paste comparing the complex aluminum chelate thickener of Comparative Example 1 with Examples 5 and 6 prepared with the experimental complex aluminum chelate thickeners of Examples 2 and 3. The addition level for this series was 1.4% by weight for all three of the aluminum organic thickeners. In this evaluation, the commercial complex aluminum chelate thickener (Comparative Example 1) reached the targeted viscosity in 96 hours and remained stable for 25 days and the experimental complex aluminum organic thickened compounds (Examples 5 and 6) thickened with the thickener of Examples 2 and 3, respectively reached the target viscosity in 72 hours and remained stable for 25 days. There was minimal drift with the complex aluminum thickened paste as all three samples shown in FIG. 2 remained in the target molding viscosity range of 10 to 15 million cP for 25 days.

The experimental complex aluminum organic thickeners demonstrated the controlled viscosity build required for SMC and BMC applications with the added benefit of a stabilized plateau viscosity in the targeted molding range. The experimental complex aluminum organic thickeners also demonstrated mechanical properties of molded parts superior to commercial complex aluminum organic thickeners and equal to or better than mechanical properties of the MgO control.

Example 7

Additional machine trials, compounding and molding, were completed comparing MgO control thickener (Control Example 1), a commercial complex aluminum chelate thickener (Comparative Example 1), and the experimental complex aluminum organic thickeners (Examples 2 and 3). The machine trials were run with a standard SMC resin paste containing thermoset polyester resin, low profile additive (shrink control), filler (calcium carbonate), initiator (curing agent), inhibitor (stabilizing agent), and mold release agent (zinc stearate). During compounding, the thickened paste mixtures were blended with 27% chopped glass rovings (2400 Tex). The resulting sheet molding compound was staged for 48 hours for maturation to the targeted molding viscosity. The aluminum organic thickeners had a stable molding viscosity as determined with Brookfield HB high viscosity viscometer equipped with T-bar spindles at approximately 15 million cP.

At 48 hours, the samples described above were ready for molding. The press force was a 2100 KN with a 457×457 mm hard chrome tool to make square panels. The SMC samples were cut into 250×250 mm charges and stacked to layers of 4 and 5. The stacked SMC charges were placed in the center of the tool with approximately 30% coverage of the tool. The tool was set at 150° C., the molding sequence was run for 300 seconds, and panels were formed.

Mechanical testing of the panels for tensile and flexural properties was determined based on ISO 527 and ISO 14125. As previously noted, panels prepared with SMC thickened with the commercial complex aluminum chelate thickener (Comparative Example 1) had tensile and flexural properties subpar to the panels prepared with MgO (Control Example 1) thickened SMC. Panels prepared with SMC thickened with the novel aluminum organic thickeners (Examples 2 and 3) had tensile and flexural properties comparable and in some instances better than panels prepared with MgO (Control Example 1) thickened SMC. The viscosity studies demonstrate the effective thickening and stable viscosity within the specified range of the novel aluminum organic thickeners. The machine trials further showed the effectiveness of the experimental aluminum organic thickeners for SMC in controlling the viscosity from compounding, through maturation, and molding. Mechanical testing of the molded parts prepared with the experimental aluminum organic thickened SMC demonstrated physical properties comparable or better than parts molded with MgO control thickened SMC.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ISO standards, or if an ISO standard does not exist for the property, the most commonly used standard known by those of skill in the art may be used. The articles "a," "an," and "the," should be interpreted to mean "one or more" unless the context indicates the contrary.

It is claimed:

1. A thickener for a molding compound comprising:
an aluminum chelate complex;
10% to 50% by weight of the thickener of a petroleum distillate and/or a polar solvent in an amount of 0.1 to 30% by weight of the thickener; and
10% to 50% by weight of the thickener of a polyester or polyester acrylate carrier resin;
wherein the aluminum content is 4% to 10% by weight of the thickener; and the thickener is essentially free of water.

2. The thickener of claim 1, wherein the petroleum distillate has a boiling point of 175° C. or greater.

3. The thickener of claim 1, further comprising the polar solvent in an amount of 0.1 to 30% by weight of the thickener.

4. The thickener of claim 1, wherein the aluminum chelate complex includes structure (III):

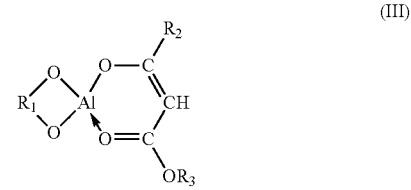

(III)

wherein $R_1$ in structure (III) is independently selected from $C_2$ to $C_{20}$ hydrocarbon groups and $R_2$ and $R_3$ are independent selected from $C_1$ to $C_{20}$ hydrocarbon groups.

5. The thickener of claim 4, wherein $R_2$ and $R_3$ are independently selected from $C_1$ to $C_8$ hydrocarbon groups.

6. A molding compound comprising:
a thickener including an aluminum chelate complex;
a thermosetting resin;
reinforcing fibers or microspheres;
a crosslinking initiator; and
an inhibitor;
wherein the thickener further includes:
10% to 50% by weight of the thickener of a petroleum distillate and/or a polar solvent in an amount of 0.1 to 30% by weight of the thickener; and
10% to 50% by weight of the thickener of a polyester or polyester acrylate carrier resin;
wherein the aluminum content is 4% to 10% by weight of the thickener; and
the thickener is essentially free of water.

7. The molding compound of claim 6, wherein the thickener includes the petroleum distillate.

8. The molding compound of claim 6, wherein the thickener further comprises the polar solvent in an amount of 0.1 to 30% by weight of the thickener.

9. The molding compound of claim 6, wherein the reinforcing fibers are glass fibers.

10. The molding compound of claim 6, wherein the molding compound is selected from sheet molding compound or bulk molding compound.

11. The molding compound of claim 6, wherein the thermosetting resin is a polyester or vinyl ester resin.

12. The molding compound of claim 6, wherein the molding compound has a flash point of 61° C. or higher.

13. A method of making a molding compound for a molded product, comprising the steps of:
(a) forming a resin paste including thermosetting resin, a crosslinking initiator, and an inhibitor;
(b) thickening the resin paste by adding an effective amount of thickener to reach a viscosity that is effective to wet-out reinforcing fibers, and is no more than 100,000 cP as determined by a Brookfield viscometer at 1 atm and 25° C. to form a thickened resin paste with reinforcing fibers, wherein the thickener includes an aluminum chelate complex;
(c) dispersing the reinforcing fibers in the resin paste;
(d) compounding the thickened resin paste with the reinforcing fibers;
(e) after compounding, producing a thickened molding compound by allowing the thickened resin paste with the reinforcing fibers to further thicken to a molding viscosity of 10 to 30 million cP; and
wherein the thickener further includes:
10% to 50% by weight of the thickener of a petroleum distillate and/or a polar solvent in an amount of 0.1 to 30% by weight of the thickener; and
10% to 50% by weight of the thickener of a polyester or polyester acrylate carrier resin;
wherein the aluminum content is 4% to 10% by weight of the thickener; and
the thickener is essentially free of water.

14. The method of claim 13, further comprising molding the thickened molding compound into a final product.

15. The method of claim 13, wherein the viscosity of the thickened molding compound does not drift more than 5% over 24 hours, when tested beginning at 48 hours after addition of the thickener, the viscosity being determined by a Brookfield viscometer at 25° C. and 1 Atm.

16. The thickener of claim 13, wherein the aluminum chelate complex corresponds to structure (III):

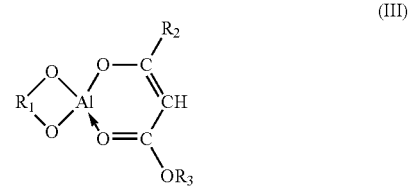

wherein $R_1$ in structure (III) is independently selected from $C_2$ to $C_{20}$ hydrocarbon groups and $R_2$ and $R_3$ are independent selected from $C_1$ to $C_{20}$ hydrocarbon groups.

17. The thickener of claim 1, wherein the thickener includes the petroleum distillate.

* * * * *